(12) United States Patent
Shipman

(10) Patent No.: US 7,870,936 B2
(45) Date of Patent: Jan. 18, 2011

(54) BICYCLE SUSPENSION SYSTEM

(75) Inventor: Christopher Shipman, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 1165 days.

(21) Appl. No.: 11/465,733

(22) Filed: Aug. 18, 2006

(65) Prior Publication Data

US 2008/0041681 A1 Feb. 21, 2008

(51) Int. Cl.
*F16F 9/34* (2006.01)
(52) U.S. Cl. .................. 188/299.1; 188/285; 267/64.25
(58) Field of Classification Search ................. 188/285, 188/299.1; 267/64.11, 64.15, 64.25, 64.27
See application file for complete search history.

(56) References Cited

U.S. PATENT DOCUMENTS

| 7,195,234 | B2 * | 3/2007 | Jordan et al. | 267/64.11 |
| 2003/0234144 | A1 * | 12/2003 | Fox | 188/278 |
| 2008/0116622 | A1 * | 5/2008 | Fox | 267/64.28 |
| 2008/0179796 | A1 * | 7/2008 | Fox | 267/64.11 |
| 2008/0296814 | A1 * | 12/2008 | Franklin et al. | 267/64.25 |

OTHER PUBLICATIONS

R. Cunningham, Sep. 17—Watch the Fox Talas Shock in Action, 2003, http://www.mbaction.com.*

* cited by examiner

*Primary Examiner*—Bradley T King
(74) *Attorney, Agent, or Firm*—Milan Milosevic; Lisa Serdynski

(57) ABSTRACT

A bicycle suspension system including a travel adjustment apparatus. The bicycle suspension system includes a piston tube and a piston assembly slidably disposed in the piston tube forming a shock-absorbing mechanism. The piston assembly is in contact with the piston tube. The travel adjustment apparatus includes first and second fluid chambers, a fluid valve mechanism for controlling fluid flow between the first and second fluid chambers, and an actuating assembly operatively connected to the fluid valve mechanism operable between at least two rider-selectable travel settings to operate the fluid valve mechanism between at least two valve settings corresponding to the rider-selectable travel settings. The first and second fluid chamber are configured such that operation of the fluid valve mechanism between two of the at least two valve settings permits the piston assembly to be moved from a first initial position relative to the piston tube to a second initial position relative to the piston tube such that the suspension system changes from a first of the at least two amounts of travel to a second of the at least two amounts of travel.

29 Claims, 4 Drawing Sheets

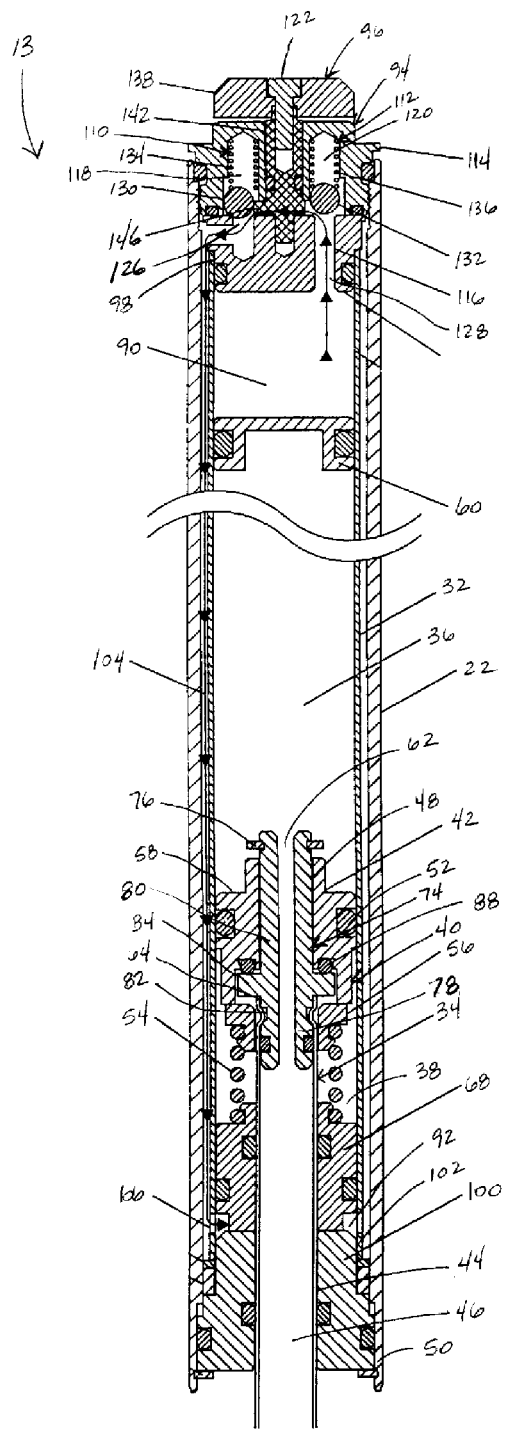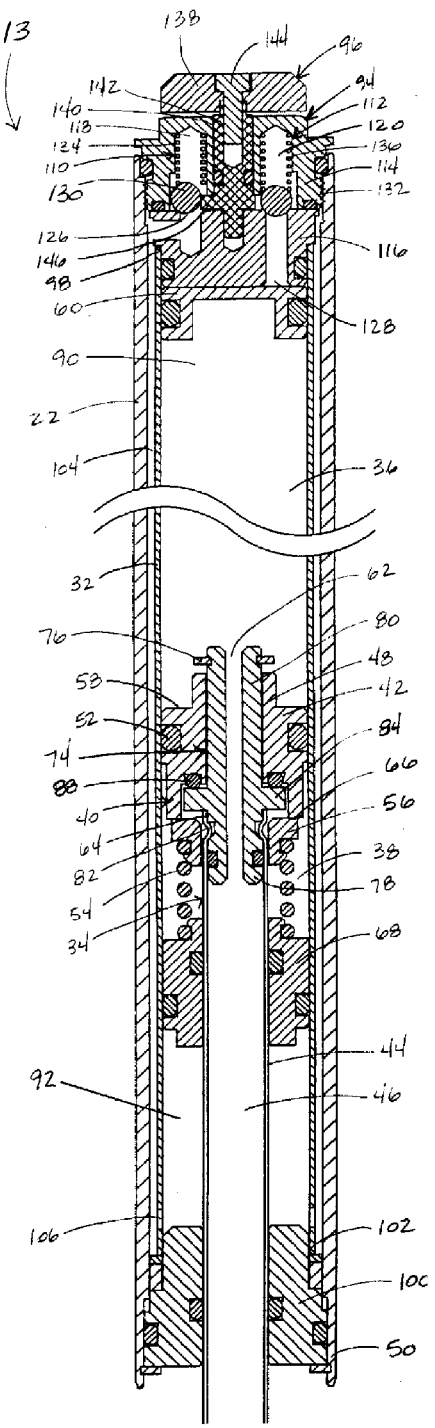
Fig. 3                    Fig. 4

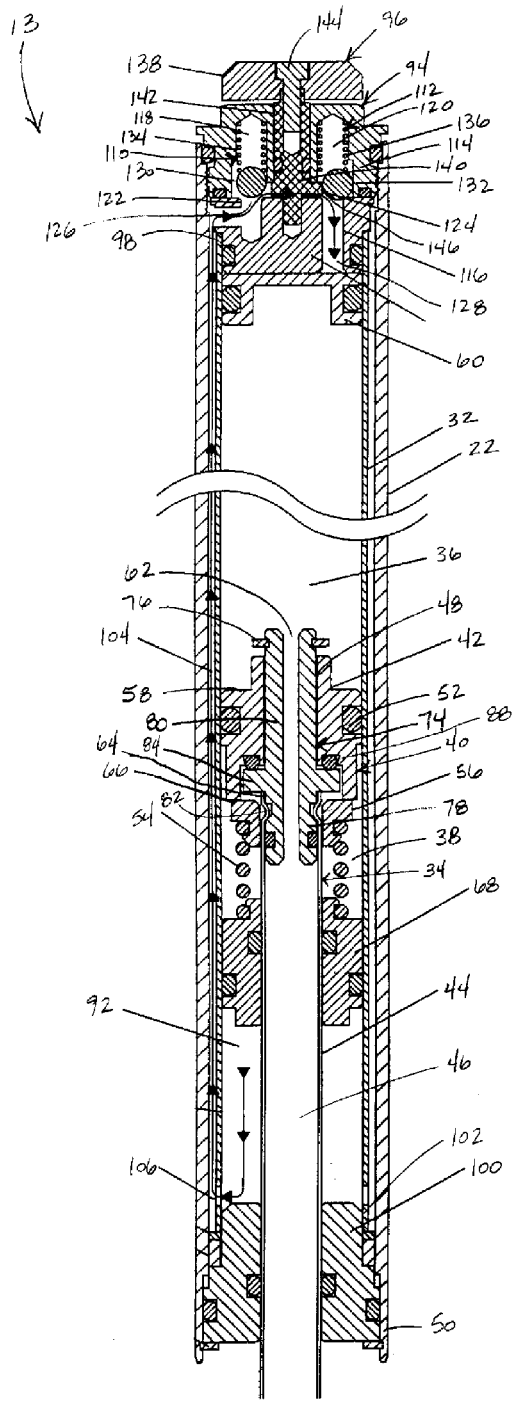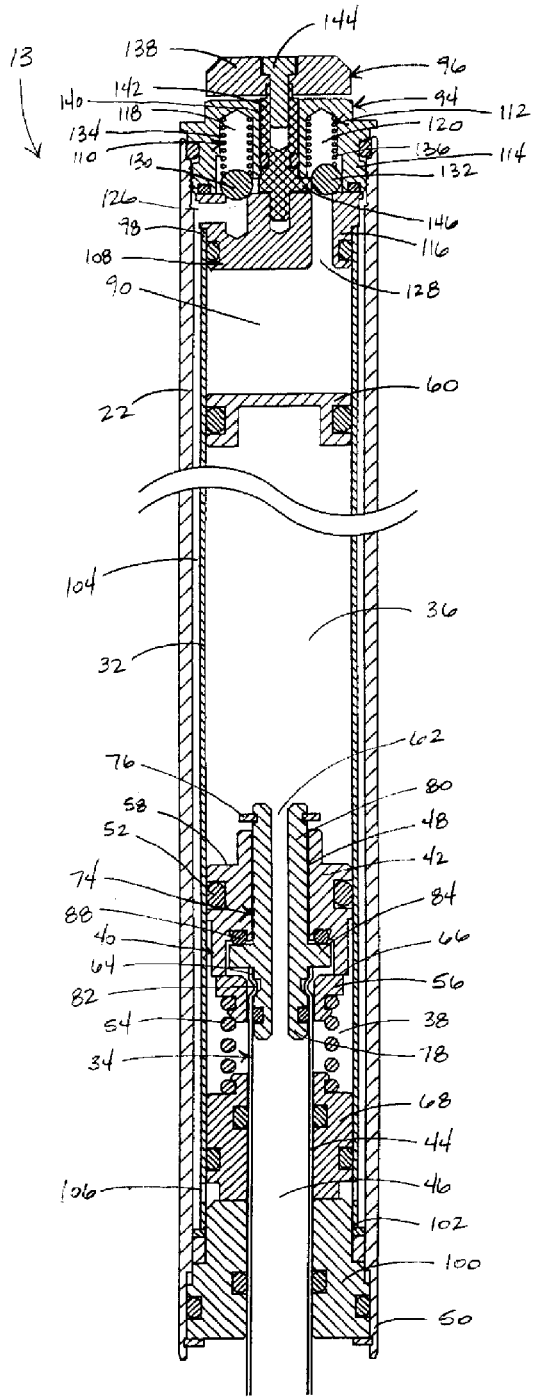
Fig. 5
Fig. 6

BICYCLE SUSPENSION SYSTEM

BACKGROUND OF THE INVENTION

The present invention relates to bicycle suspension systems and more particularly to a bicycle suspension system including an adjustment apparatus for adjusting the travel of the suspension system and/or the length of the suspension system.

Bicycles suspension systems have been developed to cushion the rider from road irregularities. Bicycle suspension systems are typically located at the front fork, rear frame assembly, the seat tube, or at other bicycle frame locations. A typical front suspension fork includes two legs, each leg having inner and outer telescoping tubes. At least one leg includes a resilient member for biasing the inner and outer tubes apart from each other and for absorbing forces applied to the fork. The resilient member may be a coil spring, an elastomer, a gas spring or the like. The maximum amount the tubes may move relative to each other is commonly referred to as the travel of the fork. A travel setting that is suitable or desirable for one terrain or rider may not be suitable or desirable for other terrains or conditions. Therefore, bicycle suspension systems with adjustable travel have been designed. However, most are either cumbersome to operate or complicated to build. Accordingly, there is a need for a less complex adjustment device that provides rapid travel adjustment.

SUMMARY OF THE INVENTION

The present invention provides a bicycle suspension system that includes a travel adjustment apparatus. The bicycle suspension system includes a piston tube and a piston assembly slidably disposed in the piston tube to form a shock-absorbing mechanism. The piston assembly is in contact with the piston tube. The travel adjustment apparatus generally includes first and second fluid chambers, a fluid valve mechanism and an actuating assembly. The fluid valve mechanism controls the fluid flow between the first and second fluid chambers. The actuating assembly is operatively connected to the fluid valve mechanism and is operable between at least two rider-selectable travel settings to operate the fluid valve mechanism between at least two valve settings corresponding to the travel settings. The first and second fluid chambers are configured such that operation of the fluid valve mechanism between two of the at least two valve settings permits the piston assembly to be moved from a first initial position relative to the piston tube to a second initial position relative to the piston tube such that the suspension system changes from a first of the at least two amounts of travel to a second of the at least two amounts of travel. Further, the movement of the piston assembly between the first and second initial positions may change the length of the suspension system from a first initial length to a second initial length.

In one embodiment of the present invention, the first and second fluid chambers are disposed in the piston tube. The piston tube is stationary relative to the valve mechanism under travel adjustment. The suspension system further includes a lower tube and an upper tube slidable relative to the lower tube. The shock-absorbing mechanism further includes first and second springs separated by the piston assembly. The springs may be gas springs, coil springs, elastomers or the like. The piston tube is disposed in the upper tube. The piston assembly includes a piston and a rod connected to the lower tube. The piston is located at an end of the rod and disposed in the upper tube. The travel adjustment apparatus further includes first and second floating pistons slidably disposed in the piston tube. The first floating piston separates the first fluid chamber and the first spring. The second floating piston separates the second fluid chamber and the second spring. The first and second fluid chambers are connected by a fluid passageway disposed between the piston tube and the upper tube. The operation of the fluid valve mechanism between two of the at least two valve settings permits displacement of the first and second floating pistons such that the suspension system changes from a first amount of travel to a second amount of travel.

The fluid valve mechanism generally includes a valve body and first and second valves and a valve body having first and second fluid openings. The first and second valves are biased toward the valve body to close the first and second fluid openings, respectively. The first valve is configured to displace away from the valve body to permit fluid flow in a first direction between the first and second fluid chambers. The second valve is configured to displace away from the valve body to permit fluid flow in a second direction between the first and second fluid chambers. In one embodiment, each of the first and second valves includes a ball and a spring to bias the balls toward the valve body to close the fluid openings in the valve body.

The actuator assembly includes a knob operatively connected to a cam. The cam is configured to be alternately engageable with the first and second valves to displace the first and second valves away from the valve body, respectively, depending on the selected travel setting.

These and other features and advantages of the present invention will be more fully understood from the following description of an embodiment of the invention, taken together with the accompanying drawings.

BRIEF DESCRIPTION OF THE DRAWINGS

In the drawings:

FIG. 3 is a cross-sectional view of the travel adjustment apparatus of FIG. 1 showing fluid flow in a first direction corresponding to a transition from a long travel setting to a short travel setting;

FIG. 4 is a cross-sectional view of the travel adjustment apparatus of FIG. 1 in the short travel setting;

FIG. 5 is a cross-sectional view of the travel adjustment apparatus of FIG. 1 showing fluid flow in a second direction corresponding to a transition from the short travel setting to the long travel setting; and FIG. 6 is a cross-sectional view of the travel adjustment apparatus of FIG. 1 in the long travel setting.

DETAILED DESCRIPTION

Figure 1:
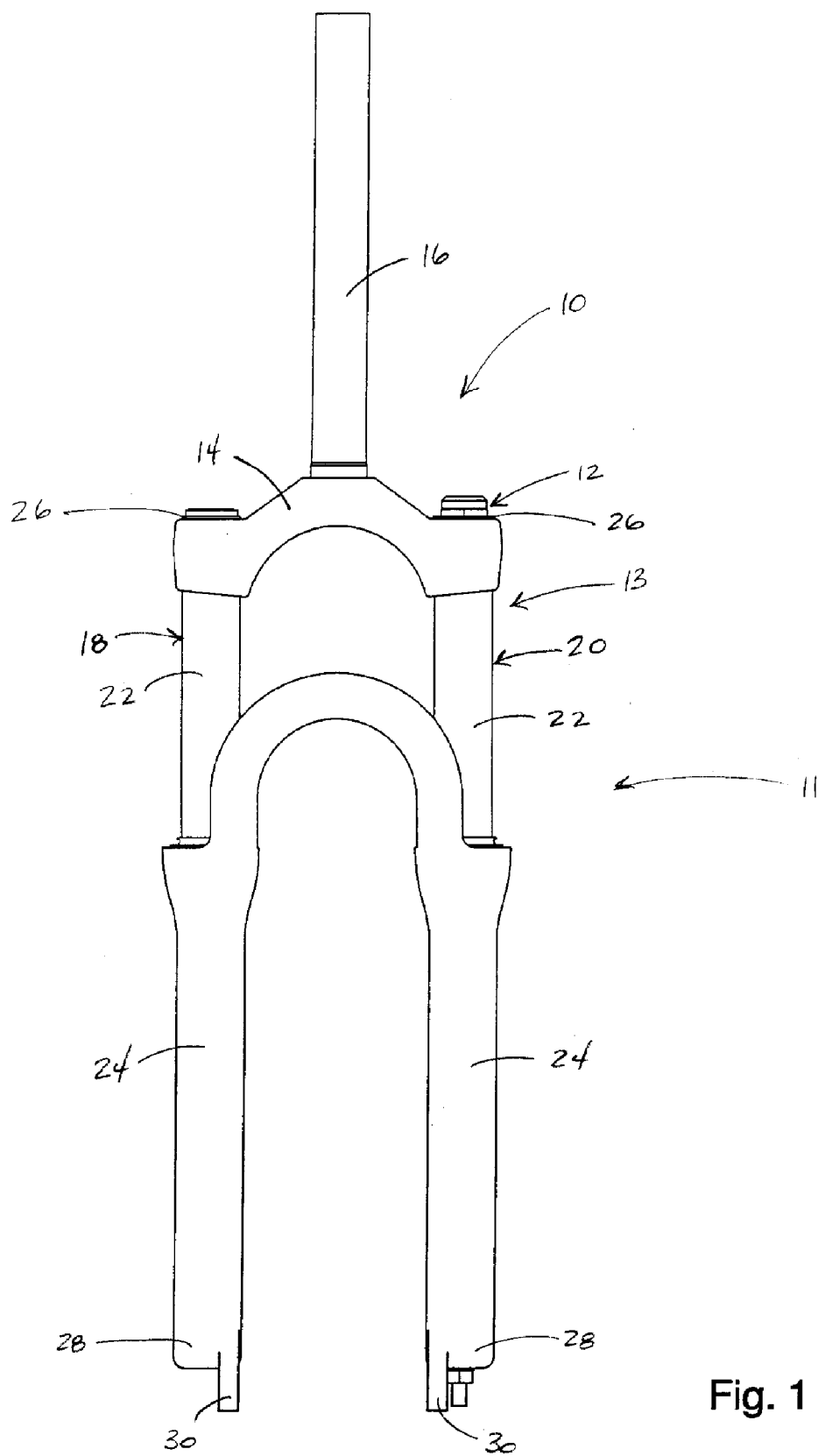
FIG. 1 is a front view of a suspension fork having a travel adjustment apparatus in accordance with one embodiment of the present invention.

FIGS. 1-6 illustrate a bicycle front fork 10 that includes a suspension system 11 including a travel adjustment apparatus 12 in accordance with one embodiment of the present invention. Looking to FIG. 1, the bicycle front fork 10 includes a crown 14 that is connected to a steerer tube 16, a first leg 18 and a second leg 20. The suspension system 11 may include a damping system in the first leg 18 and a spring system 13 in the second leg 20. Each of the legs 18, 20 include an upper tube 22 and a lower tube 24. Although the upper tubes 22 are shown as inner tubes slidable within the lower tubes 24, it will be appreciated that the lower tubes may alternatively be configured as inner tubes slidable within the outer tubes. Additionally, although the tubes 22, 24 are shown to have substantially circular cross sections, it is understood that they may be configured to any cross-sectional shape. The upper and lower tubes 22, 24 are connected at their remote ends 26 to the crown 14, and at remote ends 28 to a wheel axle (not shown) through dropouts 30.

Figure 2:
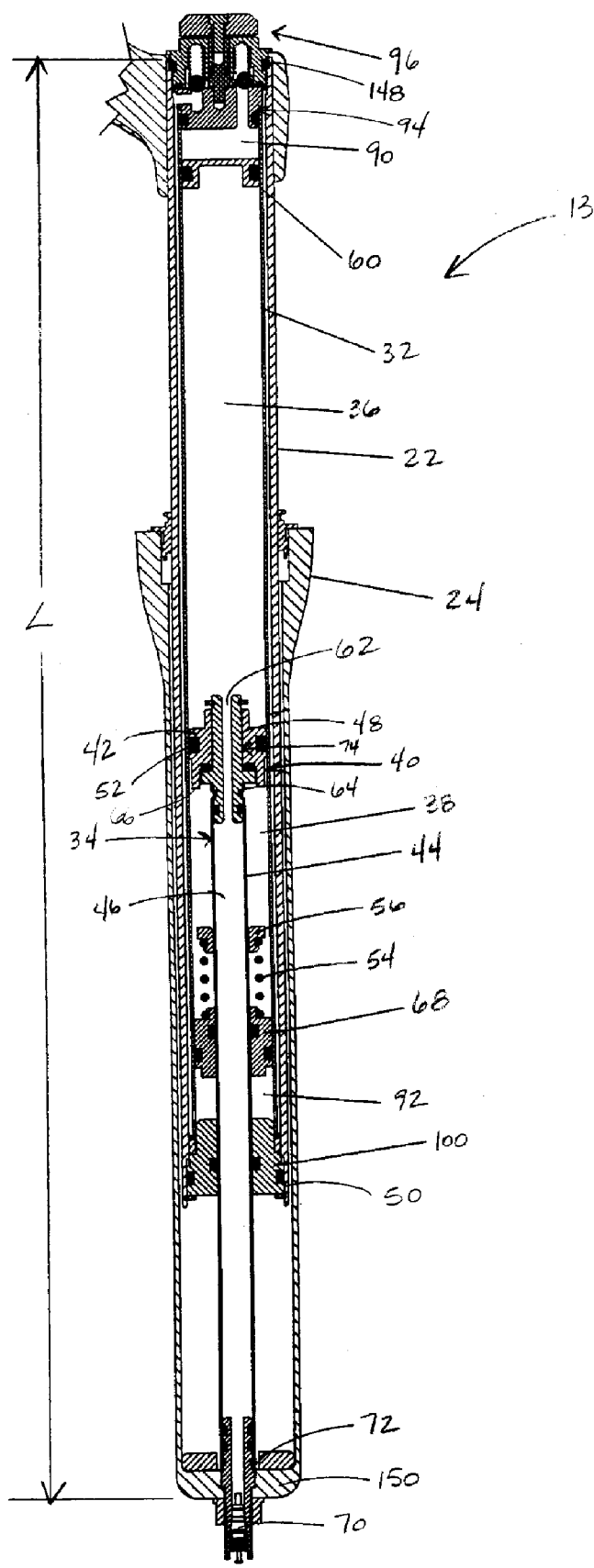
FIG. 2 is a cross-sectional view of a leg of the suspension fork of FIG. 1 including the travel adjustment apparatus.

Looking to FIG. 2, in this embodiment, the travel adjustment apparatus 12 is included with the spring system 13. The spring system 13 generally includes a piston tube 32, a piston assembly 34, first and second springs 36, 38, a gas valve mechanism 40 and the travel adjustment apparatus 12. It is to be understood that although the present invention is described with respect to a front suspension fork, typically including both upper and lower tubes, it may also be embodied in a rear suspension fork, typically including a piston assembly sliding within a single piston tube. The first and second springs, in this embodiment positive and negative gas chambers 36, 38, respectively, are separated by the piston assembly 34. Alternatively, the first and second springs may be coil springs, elastomers or the like. The piston assembly 34 generally includes a piston 42 and a piston rod 44 having a central bore 46. The piston 42 is slidably mounted within the piston tube 32 for reciprocation therein in response to compression or rebound of the suspension fork 10. The piston 42 includes a gas passageway 48 for permitting gas flow between the positive and negative gas chambers 36, 38. The piston rod 44 extends through an end 50 of the upper tube 22 and is secured to the lower tube 24. The piston 42 includes an O-ring 52 that forms a gas-tight seal with the piston tube 32.

The positive gas chamber 36 biases the upper and lower tubes 22, 24 apart from each other. The negative gas chamber 38 counteracts the force of the positive gas chamber 36 by biasing the upper and lower tubes 22, 24 toward each other. The positive and negative gas chambers 36, 38 permit the upper and lower tubes 22, 24 to compress in response to loading and expand or rebound upon removal of the load. The spring system 13 also includes a top-out spring 54 and a top-out stop element 56 to limit the expansion of the upper and lower tubes. The positive gas chamber 36 may include two volumes, the volume inside the central bore 46 of the piston rod 44 and the volume between a top surface 58 of the piston 42 and a first floating piston 60. The two volumes of the positive gas chamber 36 are in communication though a passageway 62 in a valve seat 74 of the gas valve mechanism 40 located at a first end 64 of the rod 44 and thereby function as a single volume. The negative gas chamber 38 is located between a bottom surface 66 of the piston 42 and a second floating piston 68. The positive and negative gas chambers 36, 38 are pressurized with gas through an inflation valve assembly 70 such as a Schrader valve disposed in the central bore 46 at a second end 72 of the rod 44.

Looking to FIGS. 3-6, the gas valve mechanism 40 generally includes the valve seat 74 and a valve, in this embodiment the piston 42, which is displaceable between the valve seat 74 and a retaining ring 76. The valve or piston 42 is slidably mounted within the tube 32. Although in this embodiment the valve and the piston 42 form one-piece, the valve may be formed separately from the piston. A first end 78 of the valve seat 74 extends into the central bore 46 of the piston rod 44 and is attached thereto, and a second end 80 of the valve seat 74 extends through the gas passageway 48 of the piston 42. In the embodiment shown, the first end 64 of the rod 44 may be crimped into a recess 82 of the valve seat 74. The valve seat 74 includes a perch 84 sealingly engageable with the piston 42. The gas valve mechanism 40 further includes a seal 88 disposed between the valve seat 74 and the piston 42.

During compression of the suspension fork, the gas valve mechanism 40 is in a closed position. The piston 42 is pressed against the perch 84 of the valve seat 74. As the suspension fork continues to compress, pressure builds behind the piston 42 in the positive gas chamber 36 thereby maintaining the seal between the perch 84 of the valve seat 74 and the piston 42. As the suspension fork expands and reaches top-out or a fully extended position, the piston 42 contacts the top-out stop element 56, lifting the piston 42 away from the perch 84 of the valve seat 74, thereby breaking the seal between the piston 42 and valve seat 74 to permit gas flow between the two gas chambers to substantially equalize pressure between the gas chambers. Further, when the pressure in the negative chamber 38 exceeds the pressure in the positive chamber 36, the pressure difference lifts the piston 42, opening the gas passageway to equalize the pressures in the positive and negative gas chambers 36, 38.

To pressurize the gas suspension system, gas, preferably air, is added through the inflation valve assembly 70 connected to the positive gas chamber 36. Gas fills the positive chamber 36 until the suspension fork extends to the fully extended position. Once the suspension fork reaches the fully extended position, the top-out stop element 56 engages and lifts the piston 42 away from the perch 84 of the valve seat 74, causing gas to flow into the negative gas chamber 38 through the gas passageway 48. This embodiment allows a single inflation assembly to be used to pressurize both the positive and negative gas chambers.

The travel adjustment apparatus 12 generally includes first and second fluid chambers 90, 92, a fluid valve mechanism 94 for controlling the fluid flow between the first and second fluid chambers 90, 92, and an actuator assembly 96 operable between at least two rider-selectable travel settings to operate the fluid valve mechanism 94 between at least two valve settings. The first fluid chamber 90 is located between the fluid valve mechanism 94, located at a first end 98 of the piston tube 32, and the positive gas chamber 36. The first floating piston 60 separates the first fluid chamber 90 from the positive gas chamber 36 and is slidably disposed within the piston tube 32. The second fluid chamber 92 is located between a seal head 100, located at a second end 102 of the piston tube 32, and the negative gas chamber 38. The second floating piston 68 separates the second fluid chamber 92 from the negative gas chamber 38 and is slidably disposed within the piston tube 32. A fluid passageway 104 connects the first and second fluid chambers 90, 92. The fluid passageway 104 is disposed between an inner diameter of the upper tube 22 and an outer diameter of the piston tube 32. The first fluid chamber 90 is connected to the fluid passageway 104 through the fluid valve mechanism 94 and the second fluid chamber 92 is connected to the fluid passageway 104 through an opening 106 in the piston tube 32.

The fluid valve mechanism 94 includes a valve body 108 and first and second valves 110, 112. The valve body 108 includes upper and lower portions 114, 116. The upper portion 114 of the valve body 108 is threaded into the upper tube 22 and the lower portion 116 of the valve body 108 is attached to the end 98 of the piston tube 32. The upper and lower portions 114, 116 of the valve body 108 are connected by two screws (not shown). Alternatively, the valve body may be formed as one piece. The upper portion 114 of the valve body 108 includes two cavities 118, 120 for receiving the first and second valves 110, 112. The lower portion 116 of the valve body 108 includes first and second fluid openings 126, 128 extending therethrough to allow fluid flow between the first and second fluid chambers 90, 92. The first and second valves 110, 112 control the fluid flow through the first and second fluid openings 126,128. The first and second valves 110,112 include first and second balls 130,132 and first and second springs 134,136, respectively. The first and second balls 130, 132 and springs 134, 136 are located in the first and second cavities 118,120, respectively. The springs 134, 136 bias the balls 130, 132 against the lower portion 116 valve body 108 to close the first and second fluid openings 126, 128 to prevent fluid flow between the first and second fluid chambers 90, 92.

The actuator assembly 96 includes a knob 138 and a cam, in this embodiment a cam shaft 140. The cam shaft 140 is disposed in a hole 142 in the upper portion 114 of the valve body 108 and is rotatable about its longitudinal axis. The knob 138 is connected to the cam shaft 140 by a screw 144. The cam shaft 140 includes a cam surface 146 configured to be alternately engageable with the balls 130, 132 to displace the balls away from the lower portion 116 of the valve body 108 to open one of the first and second fluid openings 126, 128 in the lower portion 116 of the valve body 108 depending on which travel setting has been selected.

In the present invention, the travel of the fork 10 refers to a maximum amount the upper and lower tubes 22, 24 may move relative to each other. The amount of fork travel is determined by the amount of fluid, preferably oil, located in the first and second fluid chambers 90, 92. FIG. 3 shows the fork 10 in a long travel setting. In this setting, the displacement of the piston assembly 34 toward the second end 102 of the piston tube 32 is limited by the position of the top-out stop element 56 and the top-out spring 54, which is determined by the position of the second floating piston 68. Further, the second floating piston 68 is in contact with the seal head 100. In the long travel setting, substantially all of the fluid in the system is located in the first fluid chamber 90.

To switch the suspension fork 10 to the short travel setting, the knob 138 is rotated thereby rotating the cam shaft 140, and in turn causing the cam surface 146 to displace the first ball 136 away from the lower portion 116 of the valve body 108, thereby opening the first fluid opening 126. Next, the rider compresses the fork 10, causing the pressure in the positive gas chamber 36 to increase and the pressure in the negative gas chamber 38 to decrease. The increase in pressure in the positive gas chamber 36 displaces the first floating piston 60 toward the first end 98 of the piston tube 32, resulting in the fluid being displaced from the first fluid chamber 90 through second fluid opening 128 in the lower portion 116 of the valve body 108. Then the fluid overcomes the force of the second spring 136 and displaces the second ball 132 away from the second valve seat 124 allowing the fluid to flow past the second ball 132, around the cam shaft 140 and past the first ball 130 into the fluid passageway 104, then through the opening 106 in the piston tube 32 into the second fluid chamber 92. As the volume of fluid increases in the second fluid chamber 92, the second floating piston 68 is displaced toward the first end 98 of the piston tube 32. As the fork 10 continues to be compressed, the fluid continues to flow from the first fluid chamber 90 to the second fluid chamber 92 until the first floating piston 60 engages the lower portion 116 of the valve body 108 (see FIG. 4). In the short travel setting, the second fluid chamber 92 is substantially full and the first fluid chamber 90 is substantially empty. When the rider stops compressing the fork 10 and releases it, the piston 42 and piston rod 44 displace toward the second end 102 of the piston tube 32 until the piston 42 engages the top-out stop element 56 (see FIG. 4). The fluid in the second fluid chamber 92 is prevented from returning to the first fluid chamber 90 by the second valve 112. Even if the rider then compresses the fork 10, fluid will not flow between the chambers 90, 92. Thus, the expansion of the fork 10 has been limited by the volume of fluid in the second fluid chamber 92. Accordingly, this setting is called the short travel setting. This adjustment operation will also change a length L of the suspension system 11 from a first initial position to a second initial position. The length L of the suspension system 11 is measured between an end 148 of the upper tube 22 and an end 150 of the lower tube 24 (see FIG. 2).

Looking to FIGS. 5 and 6, the knob 138 is rotated to select the long travel setting, allowing the fork 10 to expand a maximum amount. Rotating the knob 138 causes the cam surface 146 of the cam shaft 140 to displace the second ball 132 away from the lower portion 116 of the valve body 108, thereby opening the second fluid opening 128. When releasing the fork 10 after compression loading, the downwards force of the piston 42 pushes against the top-out stop element 56, top-out spring 54, and the second floating piston 68 causing the second floating piston 68 to displace toward the second end 102 of the piston tube 32 to displace the fluid from the second fluid chamber 92. Next, the fluid enters the fluid passageway 104 via the opening 106 in the piston tube 32, flowing toward the first fluid chamber 90, to overcome the force the first spring 134 and displacing the first ball 130 away from the lower portion 116 of the valve body 108. Then the fluid flows around the cam shaft 140, past the second ball 132, through the second fluid opening 128, and into the first fluid chamber 90. The fluid will continue to flow from the second fluid chamber 92 into the first fluid chamber 90 until substantially all of the fluid has been displaced from the second fluid chamber 92 (see FIG. 6). In this long travel setting, the first fluid chamber 90 has a maximum volume of fluid and the piston 42 and rod 44 are fully extended. The fluid in the first fluid chamber 90 is prevented from returning to the second fluid chamber 92 by the first valve 110. Further, this adjustment operation will change the length L of the suspension system 11 from the second initial length to the first initial length.

The amount of travel adjustment can be varied by varying the amount of fluid in the system. In other words, if the amount of fluid in the system is increased, there will be a relatively large difference between the travel amounts in the short and long travel settings. Conversely, if the amount of fluid in the system is decreased, there will be a relatively small difference between the amounts of travel in the two settings.

While this invention has been described with respect to one embodiment, it should be understood that numerous changes could be made without departing from the spirit and scope of the inventive concepts described. Accordingly, it is intended that the invention not be limited to the disclosed embodiment, but that it be afforded the full scope permitted by the language of the following claims.

What is claimed is:

1. A bicycle suspension system comprising:
a piston tube;
a piston assembly including a piston slidably in contact with and disposed within the piston tube, the piston assembly forming a shock-absorbing mechanism, the shock-absorbing springs including first and second springs separated by the piston assembly; and
a travel adjustment apparatus including:
first and second fluid chambers,
a fluid valve mechanism for controlling fluid flow between the first and second fluid chambers, and
an actuating assembly operatively connected to the fluid valve mechanism and operable between at least two rider-selectable travel settings to operate the fluid valve mechanism between at least two valve settings corresponding to the at least two rider-selectable travel settings, the first and second fluid chambers configured such that operation of the fluid valve mechanism between two of the at least two valve settings permits the piston to be moved from a first initial position relative to the piston tube, to a second initial position relative to the piston tube, such that the suspension system changes from a first of at least two amounts of travel, to a second of the at least two amounts of travel.

2. The bicycle suspension system of claim 1, wherein the piston tube is stationary relative to the valve mechanism under travel adjustment.

3. The bicycle suspension system of claim 1, wherein the first and second fluid chambers are disposed in the piston tube.

4. The bicycle suspension system of claim 1, further comprising upper and lower tubes, the piston tube disposed in the upper tube, the piston assembly including a rod connected to the lower tube, the piston located at an end of the rod and disposed in the upper tube.

5. The bicycle suspension system of claim 1, wherein the first and second springs are gas chambers.

6. The bicycle suspension system of claim 1, further comprising first and second floating pistons slidably disposed in the piston tube, the first floating piston separating the first fluid chamber from the first spring, the second floating piston separating the second fluid chamber from the second spring.

7. The bicycle suspension system of claim 1, further comprising an upper tube slidable relative to a lower tube, the piston tube disposed in the upper tube, a fluid passageway connecting the first and second fluid chambers, the fluid passageway disposed between the piston tube and the upper tube.

8. The bicycle suspension system of claim 1, wherein the fluid valve mechanism includes a valve body and first and second valves, a first valve configured to displace away from the valve body to permit fluid flow in a first direction between the first and second fluid chambers, a second valve configured to displace away from the valve body to permit fluid flow in a second direction between the first and second fluid chambers.

9. The bicycle suspension system of claim 8, wherein each of the first and second valves includes a ball and a spring for biasing the balls toward the valve body to close first and second fluid openings in the valve body, respectively.

10. The bicycle suspension system of claim 8, wherein the actuator assembly comprises a knob operatively connected to a cam configured to alternately engage the first and second valves to displace the first and second valves away from the valve body.

11. A bicycle suspension system comprising:
a piston tube;
a piston assembly including a piston slidably in contact with and disposed within the piston tube, the piston assembly forming a shock-absorbing mechanism, the shock-absorbing mechanism including first and second springs separated by the piston assembly; and
a length adjustment apparatus including:
first and second fluid chambers,
a fluid valve mechanism for controlling fluid flow between the first and second fluid chambers, and
an actuating assembly operatively connected to the fluid valve mechanism and operable between at least two rider-selectable length settings to operate the fluid valve mechanism between at least two valve settings corresponding to the at least two rider-selectable length settings, the first and second fluid chambers configured such that operation of the fluid valve mechanism between two of the at least two valve settings permits the piston to be moved from a first initial position relative to the piston tube, to a second initial position relative to the piston tube, such that the suspension system changes from a first initial length to a second initial length.

12. The bicycle suspension system of claim 11, wherein the piston tube is stationary relative to the valve mechanism under length adjustment.

13. The bicycle suspension system of claim 11, wherein the first and second fluid chambers are disposed in the piston tube.

14. The bicycle suspension system of claim 11, further comprising upper and lower tubes, the piston tube disposed in the upper tube, the piston assembly including a rod connected to the lower tube, the piston located at an end of the rod and disposed in the upper tube.

15. The bicycle suspension system of claim 11, wherein the first and second springs are gas chambers.

16. The bicycle suspension system of claim 11, further comprising first and second floating pistons slidably disposed in the piston tube, the first floating piston separating the first fluid chamber from the first spring, the second floating piston separating the second fluid chamber from the second spring.

17. The bicycle suspension system of claim 11, further comprising an upper tube slidable relative to a lower tube, the piston tube disposed in the upper tube, a fluid passageway connecting the first and second fluid chambers, the fluid passageway disposed between the piston tube and the upper tube.

18. The bicycle suspension system of claim 11, wherein the fluid valve mechanism includes a valve body and first and second valves, a first valve configured to displace away from the valve body to permit fluid flow in a first direction between the first and second fluid chambers, a second valve configured to displace away from the valve body to permit fluid flow in a second direction between the first and second fluid chambers.

19. The bicycle suspension system of claim 18, wherein each of the first and second valves includes a ball and a spring for biasing the balls toward the valve body to close first and second fluid openings in the valve body, respectively.

20. The bicycle suspension system of claim 18, wherein the actuator assembly comprises a knob operatively connected to a cam configured to alternately engage the first and second valves to displace the first and second valves away from the valve body.

21. A bicycle suspension system comprising:
a piston tube;
a piston assembly slidably disposed in the piston tube, the piston assembly in contact with the piston tube;
first and second springs separated by the piston assembly; and
a travel adjustment apparatus including:
first and second fluid chambers,
first and second floating pistons slidably disposed in the piston tube, the first floating piston separating the first fluid chamber from the first spring, the second floating piston separating the second fluid chamber from the second spring,
a fluid valve mechanism for controlling fluid flow between the first and second fluid chambers, and
an actuating assembly operatively connected to the fluid valve mechanism and operable between at least two rider-selectable travel settings to operate the fluid valve mechanism between at least two valve settings corresponding to the at least two rider-selectable travel settings, the first and second fluid chambers configured such that operation of the fluid valve mechanism between two of the at least two valve settings permits the first and second floating pistons to be displaced such that the suspension system changes from a first of at least two amounts of travel to a second of the at least two amounts of travel.

22. The bicycle suspension system of claim 21, wherein the piston tube is stationary relative to the valve mechanism under travel adjustment.

23. The bicycle suspension system of claim 21, wherein the first and second fluid chambers are disposed in the piston tube.

24. The bicycle suspension system of claim 21, further comprising upper and lower tubes, the piston tube disposed in the upper tube, the piston assembly including a piston and a rod connected to the lower tube, the piston located at an end of the rod and disposed in the upper tube.

25. The bicycle suspension system of claim 21, wherein the first and second springs are gas chambers.

26. The bicycle suspension system of claim 21, further comprising an upper tube slidable relative to a lower tube, the piston tube disposed in the upper tube, a fluid passageway connecting the first and second fluid chambers, the fluid passageway disposed between the piston tube and the upper tube.

27. The bicycle suspension system of claim 21, wherein the fluid valve mechanism includes a valve body and first and second valves, a first valve configured to displace away from the valve body to permit fluid flow in a first direction between the first and second fluid chambers, a second valve configured to displace away from the valve body to permit fluid flow in a second direction between the first and second fluid chambers.

28. The bicycle suspension system of claim 27, wherein each of the first and second valves includes a ball and a spring for biasing the balls toward the valve body to close first and second fluid openings in the valve body, respectively.

29. The bicycle suspension system of claim 27, wherein the actuator assembly comprises a knob operatively connected to a cam configured to alternately engage the first and second valves to displace the first and second valves away from the valve body.

* * * * *